United States Patent
Imai et al.

[11] Patent Number: 5,312,502
[45] Date of Patent: May 17, 1994

[54] METHOD AND APPARATUS FOR STITCHING A TIRE

[75] Inventors: Hisashi Imai, Nishishirakawa; Kenichi Masuda; Yoshinobu Miyanaga, both of Shirakawa, all of Japan

[73] Assignee: Sumitomo Rubber Industries Ltd., Hyogo, Japan

[21] Appl. No.: 19,450

[22] Filed: Feb. 18, 1993

[30] Foreign Application Priority Data

Feb. 19, 1992 [JP] Japan ............... 4-016569[U]
Dec. 10, 1992 [JP] Japan ............... 4-353052

[51] Int. Cl.⁵ .................................. B29D 30/28
[52] U.S. Cl. ........................ 156/130.3; 156/413; 156/421
[58] Field of Search ............ 156/130.3, 408, 409, 156/413, 421

[56] References Cited

U.S. PATENT DOCUMENTS

| | | | |
|---|---|---|---|
| 2,339,551 | 1/1944 | Stevens | 156/413 X |
| 2,406,093 | 8/1946 | Miller | 156/409 |
| 2,604,420 | 7/1952 | Barber | 156/409 |
| 2,740,460 | 4/1956 | Miller et al. | 156/413 |
| 3,305,427 | 2/1967 | Rehman | |
| 4,096,008 | 6/1978 | Taylor | |
| 4,808,257 | 2/1989 | Rex et al. | 156/421 |

FOREIGN PATENT DOCUMENTS

| | | | |
|---|---|---|---|
| 9001467 | 1/1992 | Netherlands | |
| 586953 | 4/1947 | United Kingdom | 156/413 |
| 2033315 | 5/1980 | United Kingdom | |
| 2212590 | 7/1989 | United Kingdom | |

*Primary Examiner*—Geoffrey L. Knable

[57] ABSTRACT

A tire fabricating method and apparatus for mounting a component assembly on a drum and applying a pressing force radially inward of the drum to thereby adhere a carcass, a breaker, and a tread constituting the component assembly to one another. Around the component assembly, first and second stitch roller members are arranged at positions adjacent to each other in a circumferential direction. While the drum is rotating, a fluid cylinder is elongated so as to press the first and second stitch roller members against an outer circumferential surface of the tread, and roller elements of the respective stitch roller members are moved away from each other from a center portion of the outer circumferential surface of the tread to opposite ends thereof so as to widen a spacing between the roller elements.

10 Claims, 6 Drawing Sheets

METHOD AND APPARATUS FOR STITCHING A TIRE

BACKGROUND OF THE INVENTION

This invention relates to a method and apparatus for fabricating a tire by pressing a breaker and a tread radially inward against an outer circumferential surface of an annular carcass while adhering these with one another.

Generally, the process for fabricating a radial tire includes compressively adhering a carcass, a breaker, and a tread to one another (i.e., the stitching process). Conventionally, the stitching process has been carried out as follows. As shown in FIGS. 9 and 10, a component assembly d including the carcass a, the breaker b, and the tread c is mounted on a drum e. The component assembly d is rotated together with the drum e while filling the carcass a of the component assembly d with at a specified pressure through the drum e. At the same time, a stitch roller member h including a pair of rotatable rollers f is pressed against the outer circumferential surface of the tread c using a cylinder g. The carcass a, the breaker b, and the tread c are stitched by moving the rollers f from a center of the outer circumferential surface of the tread c to opposite ends thereof. In other words, the rollers f are moved away from each other as indicated by the phantom lines f in FIG. 10.

The adhering state of the tire after the stitching operation depends upon the magnitude of the pressing force applied by the stitch roller member to the outer circumferential surface of the tread c, the pressing time during which this pressing force is applied, and the like. Further, centrifugal force acts due to the rotation of the component assembly d during this adhering operation. Accordingly, it is necessary to set the pressure of the cylinder g, the internal pressure and rotating speed of the component assembly d, the pressing time, and the like according to the shape, thickness, and compounds of the tread c in consideration of the centrifugal force in order to obtain the satisfactory adhering state.

Specifically, in order to carry out a suitable stitching operation, it is generally preferable to increase the pressing force of the stitch roller member h by increasing the pressure of the cylinder g and the internal pressure of the component assembly d. However, if the pressing force is set at a high value, a portion of the component assembly d in contact with the stitch roller member h is suspectable to deformation. This may cause an inferior rubber flow at the time of vulcanization and poor appearance due to flaws. Further, an excessive pressing force causes a partial slip at a turned-up portion of a carcass ply, causing variations in the circumferential cord path (the length of a path extending from one turned-up portion to the other along the carcass ply. This may damage the dynamic uniformity of the tire.

At the same time, it is desirable to attain a sufficiently long pressing time of applying the pressing force in order to carry out the stitching operation properly. The longer the pressing time, the longer a cycle time required to fabricate one tire. This hinders improved productivity.

SUMMARY OF THE INVENTION

In view of the problems existing in the prior art, it is an object of the invention to provide method and apparatus for fabricating a tire which are capable of carrying out a satisfactory adhering operation within a short period of time without applying an excessive pressing force to the component assembly while improving the quality of the tire and improve the productivity of the tire manufacturing process.

According to a tire fabricating method of the invention, an annular carcass is mounted on an outer circumferential surface of a drum; a breaker and a tread are placed over the carcass; and the carcass, breaker, and tread are pressed radially inward of the drum to thereby adhere the same to one another. Specifically, the method is characterized so that the first and second stitch roller members are arranged in parallel with a rotatable shaft of the drum and pressed against an outer circumferential surface of the tread at positions shifted to each other in a circumferential direction of the tread while rotating the carcass, breaker, and tread together with the drum and, at the same time, roller elements of each stitch roller member are moved away from each other from a center portion of the outer circumferential surface of the tread to opposite ends thereof so as to widen the spacing between the roller elements.

Further, a tire fabricating apparatus according to the invention is adapted for mounting an annular carcass on an outer circumferential surface of a drum, placing a breaker and a tread over the carcass, and pressing the carcass, breaker, and tread radially inward to thereby adhere the same to one another. Specifically, the apparatus includes drive means for rotating the drum; a first stitch roller member including a pair of roller elements and arranged in parallel with a rotatable shaft of the drum; a second stitch roller member including a pair of roller elements and arranged in parallel with the rotatable shaft of the drum at a position shifted from the first stitch roller member in a circumferential direction of the tread; pressing means for rotatably supporting and pressing the first and second stitch roller members against the outer circumferential surface of the tread; and widening means for moving the roller elements of each stitch roller member away from each other from a center portion of the outer circumferential surface of the tread to opposite ends thereof so as to widen a spacing between the roller elements.

With the tire fabricating apparatus so constructed, both the first and second stitch roller members are pressed against the outer circumferential surface of the tread of the component assembly during rotation. Accordingly, the total pressing force applied to the outer circumferential surface of the tread is a sum of the pressing forces applied by the first and second stitch roller members. Thus, a sufficient pressing force can be attained as a whole to carry out a satisfactory stitching operation even without increasing the pressing forces applied by the individual stitch roller members. This contributes to a reduce the in production of defective products which occur when the pressing forces of the respective stitch roller members are increased to improve the quality of the tire, and suppresses deformation of the component assembly due to the excessive pressing force to thereby prevent an inferior rubber flow at the time of vulcanization and improves the uniformity of the tire. Further, the pressing time can be shortened as compared to a method or apparatus using a single stitch roller member, with the result being that a cycle time for fabricating one tire can be shortened and productivity improved.

It is desirable to arrange the first and second stitch roller members at positions adjacent to each other in the circumferential direction of the tread. With this arrangement, the stitching effect can be further improved. For instance, when the first stitch roller member is located at a more upstream position with respect to a rotating direction of the drum than the first stitch roller member, the stitching operation is carried out as follows. First, the outer circumferential of the tread is pressed by the first stitch roller member once, thereby adhering the carcass, the breaker, and the tread to one another. Thereafter, the outer circumferential surface of the tread is pressed by the second stitch roller member before the adhesion is loosened due to the centrifugal force generated by the rotation of the component assembly and the restoring force of the tread as a rigid body. Accordingly, a higher adhering effect can be obtained.

More specifically, the first and second stitch roller members are located at adjacent positions so that the tread is pressed by the second stitch roller member before restoration of the tread into its original form, and after the tread is pressed by the first stitch roller member.

If the first stitch roller member is arranged at a more upstream position with respect to the rotating direction of the drum and at a weaker force than the second stitch roller member, deformation of the tread can be avoided since the strong pressing force is not applied abruptly to the outer circumferential surface of the rotating tread. In other words, since the weak pressing force is first applied by the first stitch roller member and the strong pressing force is then applied by the second stitch roller member, the stitching operation can be carried out smoothly.

The pressing means for supporting the respective roller elements may include a support member for rotatably supporting the roller elements of the first and second stitch roller members located at the same side as defined by the center portion of the outer circumferential surface of the tread in a state where these roller elements are arranged side by side in the circumferential direction of the tread, and a pressing member for moving the support member and the roller elements supported by the support member integrally toward the outer circumferential surface of the tread in an inward radial direction of the tread. In addition, the support member may be coupled with the pressing member rotatable about an axis parallel with the rotatable shaft of the drum. With this arrangement, even if a pressing direction of the pressing member does not coincide precisely with a direction normal to the rotatable shaft of the drum, its directional deviation can be offset by the rotation of the support member when the respective roller elements are pressed against the outer circumferential surface of the tread (i.e. by the inclination of the support member relative to the pressing member). Therefore, all the roller elements can be pressed against the outer circumferential surface of the tread constantly and satisfactorily.

These and other objects, features and advantages of the present invention will become more apparent upon a reading of the following detailed description and accompanying drawings.

DETAILED DESCRIPTION OF PREFERRED EMBODIMENT

A first preferred embodiment of the invention will be described with reference to FIGS. 1 to 5.

Figure 1:
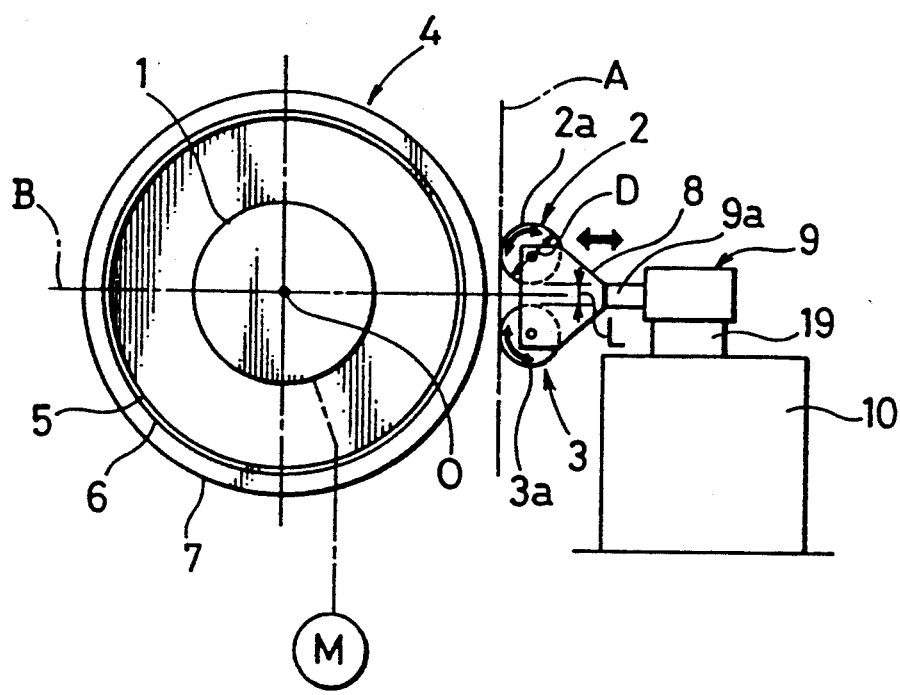
FIG. 1 is a front view showing a first tire fabricating apparatus embodying the invention.
Figure 2:
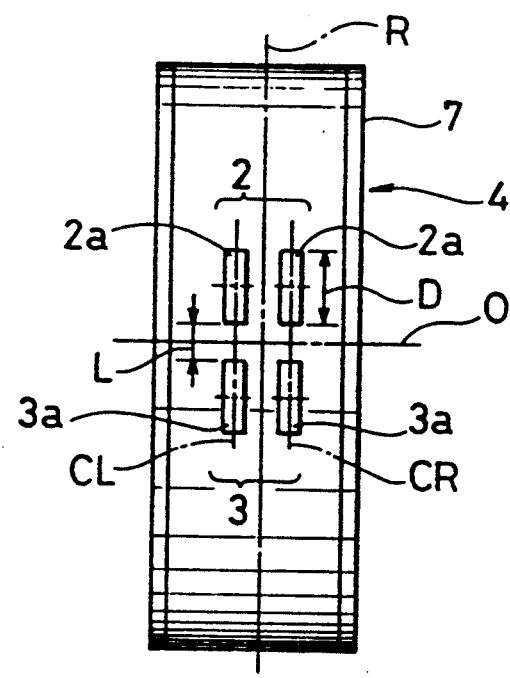
FIG. 2 is a side view showing a positional relationship between an outer circumferential surface of a tread and respective stitch roller members in the first tire fabricating apparatus.

A tire fabricating apparatus shown in FIGS. 1 and 2 is provided with a rotatable drum 1. The drum 1 is coupled with and rotated by a motor (drive means) M in a specified direction and at a specified speed about a shaft center O thereof. On an outer circumferential surface of the drum 1 are mounted an annular carcass 5, a breaker 6, and a tread 7 in this order. The carcass 5, breaker 6, and tread 7 constitute a component assembly 4. The drum 1 is constructed so as to fill the carcass 5 with air from the circumferential surface thereof at a given pressure (e.g. 0.5 to 1.5 kg/cm).

First and second stitch roller members 2 and 3 are arranged around the drum 1 in a circumferential direction of the drum. The stitch roller members 2, 3 are positioned adjacent to each other in the circumferential direction of the drum 1. The first stitch roller member 2 includes first left and right roller elements 2a spaced apart in parallel with the rotatable shaft O of the drum 1. Likewise, the stitch roller member 3 includes second left and right roller elements 3a spaced apart in parallel with the rotatable shaft O.

As shown in FIG. 2, each pair of roller elements 2a, 3a hold a tread center line R normal to the rotatable shaft O therebetween, and are arranged on circumferentially extending lines CL, CR parallel with the tread center line R. In other words, the left roller elements 2a, 3a are arranged on the line CL, whereas the right roller elements 2a, 3a are arranged on the line CR.

There will be described a pressing mechanism and a widening mechanism which support the roller elements 2a, 3a with reference to FIGS. 1 and 3.

A housing 10 for accommodating the widening mechanism is placed on a stable surface and a pair of fluid cylinders 9 are provided above the housing 10. These fluid cylinders 9 are arranged in parallel with the drum rotatable shaft O, and a rod 9a extends from each cylinder 9 so as to be opposed to the drum 1. At a leading end of each rod 9a is fixed a plate-like support member 8 extending along a vertical plane. The roller elements 2a, 3a located on the left side of the tread center line R are mounted at upper and lower portions of the left support member 8 rotatably through bearings or the like. Likewise, the roller elements 2a, 3a located on the right side are mounted at upper and lower portions of the right support member 8 rotatably through bearings or the like.

The roller elements 2a, 3a are arranged such that a line A tangent to the respective stitch roller members 2 and 3 is normal to a horizontal line B passing through the rotatable shaft O of the drum 1 and rotatable shafts of the stitch roller members 2 and 3 are located substantially symmetrically with respect to the horizontal line B when viewed from the front as shown in FIG. 1. The respective rods 9a are arranged such that their center axes are located on the horizontal line B when viewed from the front. In other words, the rods 9a extend in a direction normal to the drum rotatable shaft O.

Figure 3:
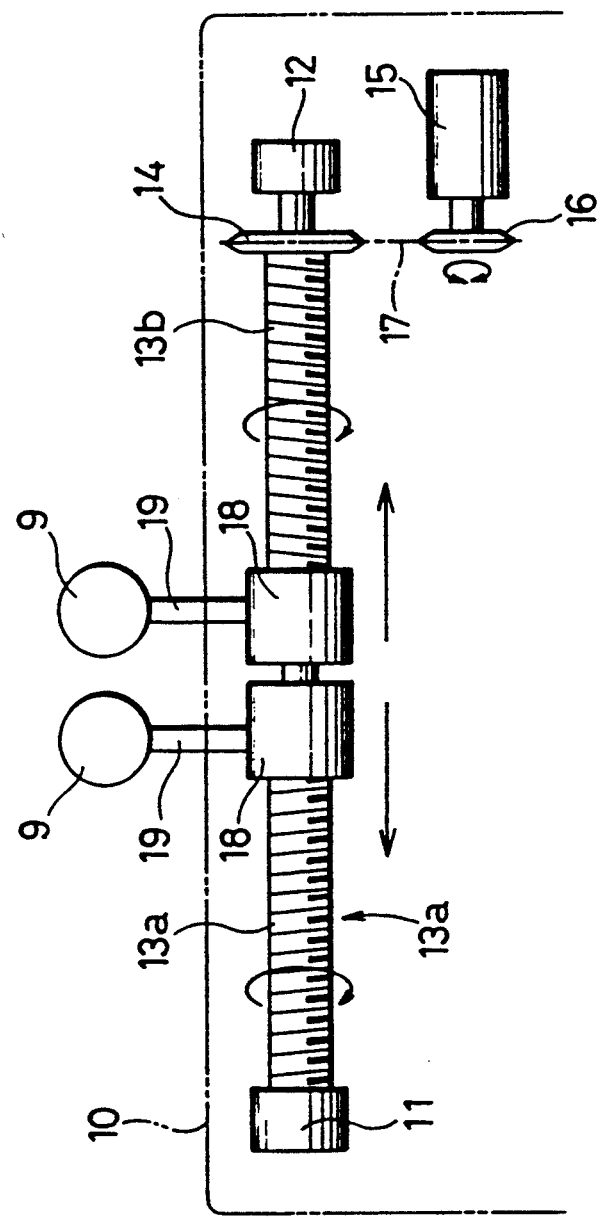
FIG. 3 is a side view showing a mechanism for widening a spacing between roller elements of each stitch roller member.

As shown in FIG. 3, a screw shaft 13 is rotatably mounted through bearings 11, 12 in the housing 10. This screw shaft 13 extends in parallel with the drum rotatable shaft O, and has a first screw portion 13a formed on an outer circumferential surface of a left half thereof while having a second screw portion 13b whose thread is extending spirally in a direction opposite to the first screw portion 13a formed on an outer circumferential surface of a right half thereof. A sprocket 14 is fixed at a right end of the screw shaft 13. Below the screw shaft 13 is provided a motor 15 for driving the widening mechanism. On an output shaft of the motor 15 is fixed a sprocket 16, which is coupled with the sprocket 14 through a chain 17.

A nut 18 is externally fitted to each of the screw portions 13a, 13b of the screw shaft 13. A cylinder support member 19 extends upward from each nut 18 up to a position above a top surface of the housing 1, and the fluid cylinder 9 is fixed at an upper end of each cylinder support member 19.

Accordingly, when the left and right fluid cylinders 9 are elongated further, the support members 8 fixed at the rods 9a of the fluid cylinders 9 and the roller elements 2a, 3a supported by the support members 8 moves integrally toward the outer circumferential surface of the tread 7, thereby pressing the roller elements 2a, 3a against the outer circumferential surface. In addition, the motor 15 is driven in the specified direction, and a driving force thereof is transmitted to the screw shaft 13 through the sprockets 16, 14 and the chain 17. According to rotation of the screw shaft 13, a first group including the nut 18, fluid cylinder 9, support member 8, and roller elements 2a, 3a located at the left side and a second group including the nut 18, fluid cylinder 9, support member 8, and roller elements 2a, 3a located at the right side move away from each other. In this way, the roller elements 2a, 3a are spaced apart from each other from the center of the outer circumferential surface of the tread 7 to opposite ends thereof.

A diameter D of the roller elements 2a, 3a is desirably about 50 mm to 100 mm when a normal size tire is fabricated. Further, a spacing L between the corresponding roller elements 2a and 3a is desirably set in a range of $0 < L \leq 174 D$, i.e. the spacing L is desirably set at an present small value as compared with the diameter D. In other words, it is desirable to position the stitch roller members 2, 3 at positions spaced apart but as close to each other as possible.

There will be next described a sequence of stitching processes for the carcass 5, the breaker 6, and the tread 7 performed using the described apparatus.

(a) The carcass 5 is mounted on the outer circumferential surface of the drum 1 as shown in FIG. 1, and the air carcass 5 is filled with air at the specified pressure, thereby inflating the carcass 5. Further, the tread 7 is rolled on the outer circumferential surface of the carcass 5 through the breaker 6. That is to say, the component assembly 4 is mounted around the drum 1.

(b) The motor M is driven in the forward or reverse direction, thereby causing the drum 1 to rotate about its rotatable shaft O. At this time, the component assembly 4 rotates together with the drum 1.

Figure 4:
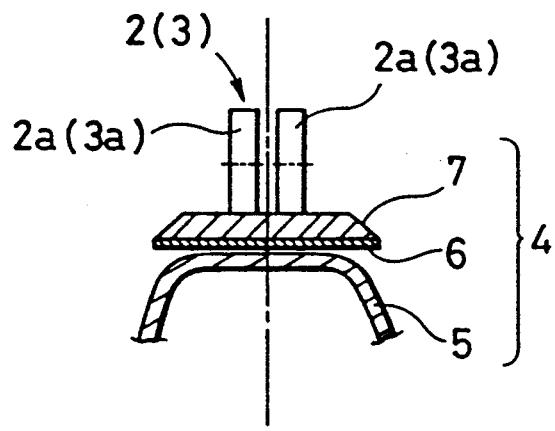
FIG. 4 is a sectional view showing a state of the stitch roller member before the spacing between the roller elements is widened.

(c) The left and right fluid cylinders 9 are elongated while the drum 1 is rotating in a state where the left and right nuts 18 and the fluid cylinders 9 are located at the center as shown in FIG. 3. This causes the roller elements 2a, 3a supported by the left and right support members 8 to be pressed against the center portion of the outer circumferential surface of the tread 7 as shown in FIGS. 2 and 4. At this time, the left and right roller elements 2a of the first stitch roller member 2 and the left and right roller elements 3a of the second stitch roller member 3 are pressed against the outer circumferential surface of the tread 7 in positions shifted in the circumferential direction (upper and lower positions in the illustrated example).

Figure 5:
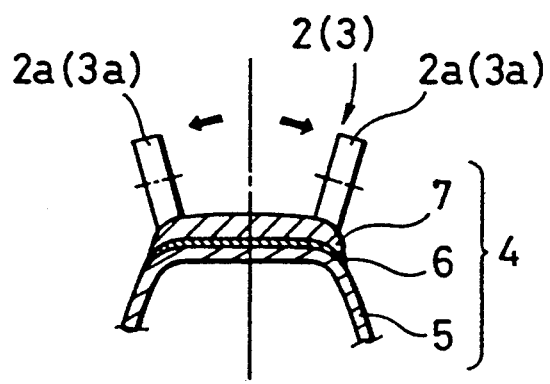
FIG. 5 is a sectional view showing a state of the stitch roller member after widening the spacing between the roller elements.

(d) While the roller elements 2a, 3a are pressed against the outer circumferential surface of the tread 7, the motor 15 is driven to move the left and the right nuts and fluid cylinders 9 to move away from each other. Thereby, the left roller elements 2a, 3a and the right roller elements 2a, 3a move toward the left and right ends of the outer circumferential surface from the tread center line R. In other words, the roller elements 2a, 3a are moved continuously and simultaneously from the center portion of the outer circumferential surface of the tread 7 to the opposite ends thereof as shown in FIG. 5 while being pressed against the outer circumferential surface of the tread 7. By the aforementioned operations, the carcass 5, the breaker 6, and the tread 7 are adhered to one another from the center portion to the opposite ends thereof.

(e) After the stitching operation, the stitch roller members 2, 3 are moved backward and a next component assembly 4 is mounted on the drum 1. The stitching operation is applied to this next component assembly 4 in a procedure similar to the above.

With the method and apparatus as described above, the first and second stitch roller members 2, 3 are pressed against the outer circumferential surface of tread 7 at positions shifted circumferentially to each other. Accordingly, a sufficient pressing force can be applied to the outer circumferential surface of the tread 7 as a whole even without increasing the pressing force of the individual stitch roller members 2, 3. Thus, a satisfactory stitching operation can be performed while avoiding deformation of the component assembly and slippage at the turned-up portion of the carcass ply due to the excessive pressing. Further, there can be obtained an adhering effect substantially similar to the one obtained when the pressing time is extended twice as long by arranging the stitch roller members 2, 3. Thus, a sufficient stitching operation can be carried out within a shorter period of time than the prior art, thereby improving productivity.

Particularly in this embodiment, since the first and second stitch roller members 2, 3 are positioned circumferentially adjacent to each other, the stitching operation can be carried out advantageously. For example, the drum 1 is rotated in a clockwise direction as shown in FIG. 1. First, the outer circumferential of the tread 7 is pressed by the first stitch roller member 2 once, thereby adhering the carcass 5, the breaker 6, and the tread 7 to one another to some degree. Thereafter, the outer circumferential surface of the tread 7 is pressed by the second stitch roller member 3 before the obtained weakens due to the centrifugal force generated by the rotation of the component assembly 4 by reinforcing the adhesion of the tread 7 as a rigid body. Accordingly, a higher adhering effect can be obtained as compared to having the stitch roller members 2, 3 are arranged distant from each other.

Since the stitch roller members 2, 3 are arranged adjacent to each other, the roller elements located at the same side (i.e., the left roller elements and the right roller elements) can be supported by a single support member 8 and can be pressed against the outer circumferential surface of the tread 7 using a single fluid cylinder. Thus, the number of parts constituting the tire fabricating apparatus can be reduced, and the widening mechanism for widening the spacing between the left and right roller elements can be simplified in its construction compared to a tire fabricating apparatus in which the roller elements are driven independently.

Even if the stitch roller members 2, 3 are not arranged adjacent to each other, it is possible to reduce the pressing force of the stitch roller members 2, 3 compared to the conventional apparatus by pressing the members 2, 3 against the outer circumferential surface of the tread 7 simultaneously at positions shifted circumferentially to each other.

It may be appropriate to provide additionally additional stitch roller members at positions different from the first and second stitch rollers.

Figure 6:
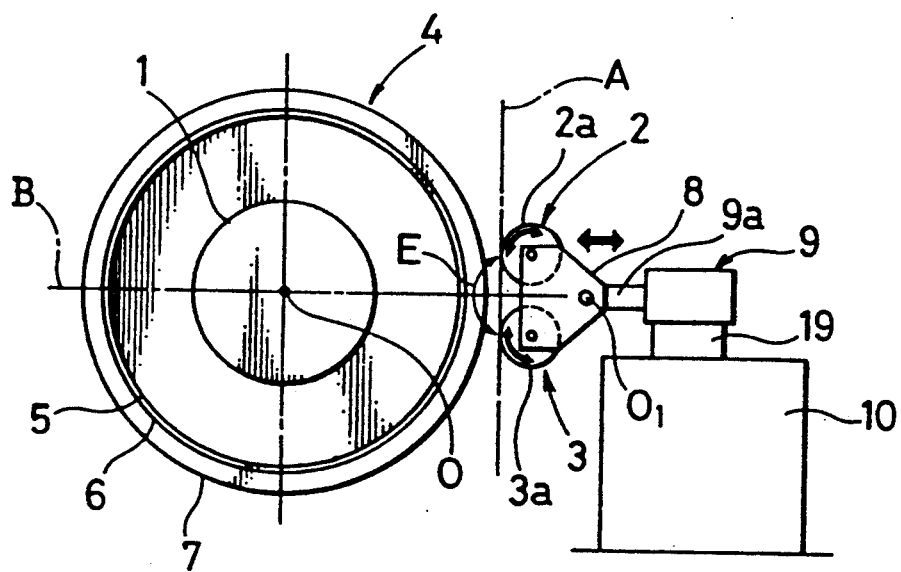
FIG. 6 is a front view showing a second preferred embodiment of a tire fabricating apparatus embodying the invention.
Figure 7:
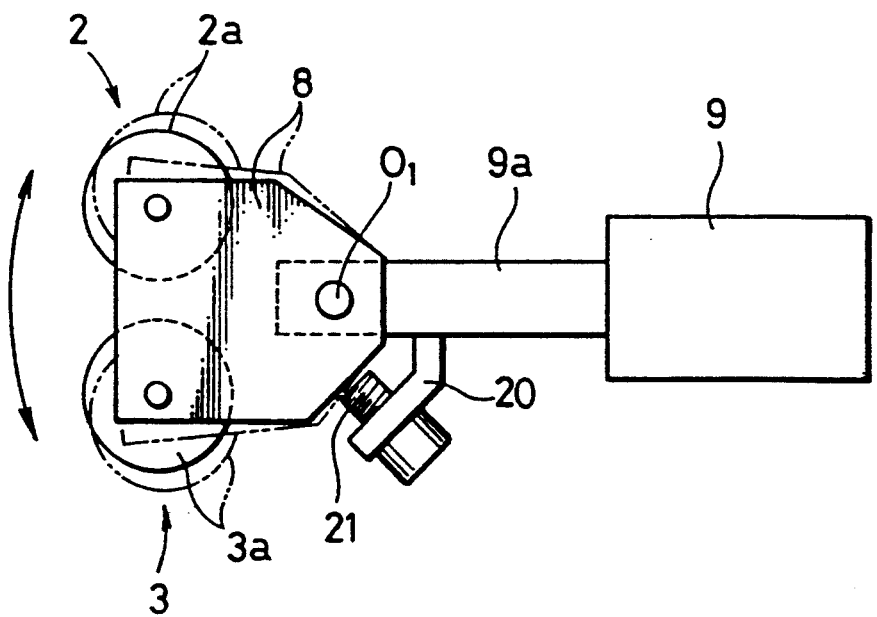
FIG. 7 is a front view showing a pressing mechanism in the second preferred embodiment of a tire fabricating apparatus.

There will be described a second preferred embodiment with reference to FIGS. 6 and 7.

In this embodiment, a support member is coupled with a rod 9a of each fluid cylinder 9 rotatably about a shaft O, parallel with a rotatable shaft O of a drum 1. Positions of the roller elements 2a, 3a vary angularly relative to the corresponding rod 9a according to rotation of this support member 8 (as indicated by phantom line in FIG. 7). There is also provided a support piece 20 which extends toward the support member 8. A stopper (angle holding member) 21 projecting toward the support member 8 is fixed at an end of the support piece 20. The support member 8 comes in contact with this stopper 21 when the roller elements 2a, 3a are not in contact with the outer circumferential surface of the tread 7, thereby being preventing the roller-elements from rotating downward due to the weight of the support member 8 and the roller elements 2a, 3a. In this way, the stopper 21 holds the support member 8 in a substantially horizontal position as illustrated.

With the above-discussed apparatus, even if a rod 9a extends in a direction of the rod 9a not coincide precisely with a direction normal to the drum rotatable shaft O (i.e., the rod 9a is inclined with respect to the direction normal to the drum rotatable shaft O), the support member 8 and the roller elements 2a, 3a are free to rotate relative to the rod 9a according to this inclination. Therefore, all the roller elements 2a, 3a can be pressed against the outer circumferential surface of the tread 7 constantly and reliably.

Further in this apparatus, the stopper 21 is provided to restrict downward rotation of the support member 8 if the roller elements 2a, 3a are not in contact with the outer circumferential surface of the tread 7. Accordingly, the roller elements 2a, 3a can be pressed against the outer circumferential surface of the tread smoothly merely by elongating the fluid cylinder 9.

As an angle holding member for maintaining an angle of rotation of the support member 8 in a specified range, a spring may be provided between the support member 8 and the rod 9a instead of the stopper 21. The support member 8 may be held in a suitable position against the compressed spring.

There will be described a third preferred embodiment next with reference to FIG. 8.

In this embodiment, a second stitch roller member 3 projects more forward than a first stitch roller member 2 in the apparatus of the first embodiment. With this arrangement, the first stitch roller member 2 is pressed against an outer circumferential surface of a tread 7 with comparatively less force than the second stitch roller member 3 in a state where the fluid cylinder 9 is elongated.

Figure 8:
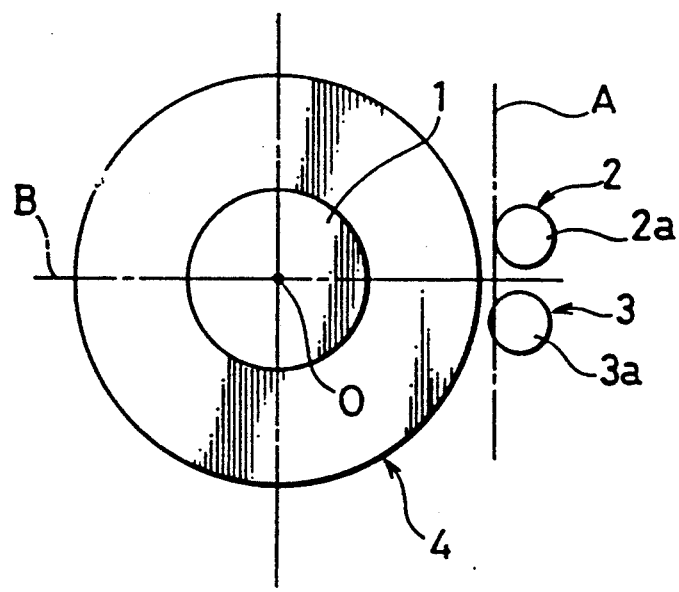
FIG. 8 is a front view showing a positional relationship between a component assembly and respective stitch roller member in a third preferred embodiment tire fabricating apparatus.
Figure 9:
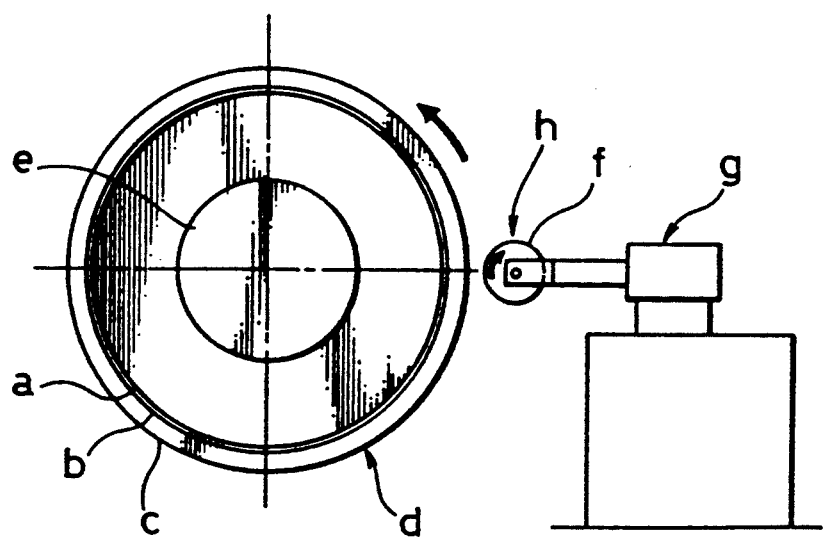
FIG. 9 is a front view showing a conventional tire fabricating apparatus.
Figure 10:
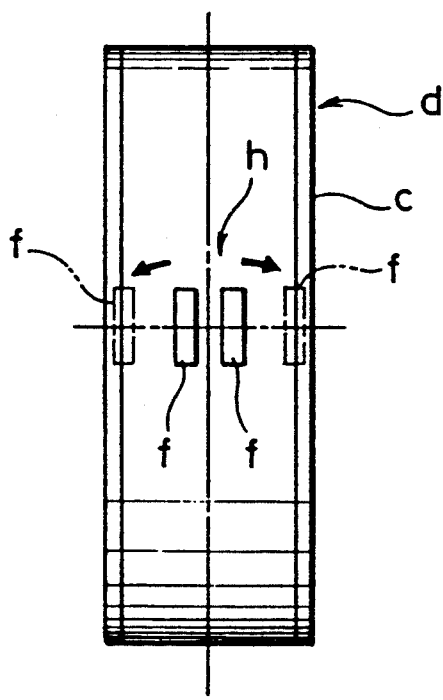
FIG. 10 is a side view showing a positional relationship between an outer circumferential surface of a tread and respective stitch roller members in the conventional tire fabricating apparatus.

With this embodiment of the apparatus, the drum 1 and the component assembly 4 are rotated in a clockwise direction in FIG. 8, and the outer circumferential surface of the tread 7 is first pressed with the weaker force by the first stitch roller member 2, and is thereafter pressed by at the stronger force by the second stitch roller member 3. Thus, the stitching operation can be preformed effectively while preventing an occurrence where the strong force is applied to the outer circumferential surface of the tread 7 abruptly to thereby deform the component assembly.

As a means for applying the different pressing forces, the roller elements 2a, 3a may be mounted on the support member 8 at horizontally shifted positions in advance. Alternatively, it may be appropriate to adjust the projected amounts of the roller elements 2a, 3a by rotating the support member 8 about the shaft O as shown in the second embodiment, and then to fix the support member 8 on the rod 9a. Where the first and second stitch roller members 2, 3 are supported by separate pressing mechanisms, the pressing forces generated by the pressing mechanisms may be set individually to thereby differ the pressing forces of the stitch roller members 2, 3 from each other.

In the third embodiment, the pressing force of the first stitch roller member 2 is comparatively less than that of the second stitch roller member 3. Alternatively pressing force of the second stitch roller member 3 may be set to apply less force than that of the first stitch roller member 2 to achieve a similar effect by rotating the drum 1 in a counterclockwise direction in the in the drawing of FIG. 8.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A method for fabricating a tire, the steps of the method comprising:

mounting an annular carcass on an outer circumferential surface of a rotatable drum;

placing a breaker and a tread over the carcass;

pressing against an outer circumferential surface of the tread radially inward of the drum to thereby adhere the carcass, breaker, and tread to one another using first and second stitch roller members, each including first and second roller elements arranged in parallel with a rotatable shaft of the drum, the first roller elements arranged at positions shifted to each other in a circumferential direction of the tread and aligned in parallel with respect to each other along a first circumferential line about the rotatable drum parallel with a tread centerline and the second roller elements arranged at positions shifted to each other in a circumferential direction of the tread and aligned in parallel with respect to each other along a second circumferential line about the rotatable drum parallel with the tread centerline and located on the opposite side of said tread centerline from said first circumferential line;

rotating the carcass, breaker, and tread together with the drum and, at the same time, moving the roller elements of each stitch roller member away from each other and a center portion of the outer circumferential surface of the tread to opposite ends thereof.

2. A tire fabricating method according to claim 1 wherein the roller elements of the first and second stitch roller members are of the same diameter and spaced from each other a distance equal to or less than ¼ the diameter of a roller element along the outer circumferential surface of the tread in the circumferential direction of the tread.

3. A tire fabricating method according to claim 1 wherein during said pressing and rotating steps, the second stitch roller member is pressed with a stronger force against the outer circumferential surface of the tread and at a position downstream with respect to a rotating direction as compared to the first stitch roller member.

4. A tire fabricating apparatus for mounting an annular carcass on an outer circumferential surface of a drum, placing a breaker and a tread over the carcass, and pressing the carcass, breaker, and tread radially inward of the drum to thereby adhere the same to one another, the apparatus comprising:

a rotatable drum;

drive means for rotating the drum;

a first stitch roller member, including first and second roller elements arranged in parallel with a rotatable shaft of the drum;

a second stitch roller member, including first and second roller elements arranged in parallel with the rotatable shaft of the drum at a position shifted from the roller elements of the first stitch roller member in a circumferential direction of the tread, the first roller elements aligned in parallel with respect to each other along a first circumferential line about the rotatable drum parallel with a tread centerline and the second roller elements aligned in parallel with respect to each other along a second circumferential line about the rotatable drum parallel with the tread centerline and located on the opposite side of said tread centerline from said first circumferential line;

pressing means for rotatably supporting and pressing the first and second stitch roller members against the outer circumferential surface of the tread; and widening means for moving the roller elements of each stitch roller member away from each other from a center portion of the outer circumferential surface of the tread to opposite ends thereof so as to widen a spacing between the roller elements.

5. A tire fabricating apparatus according to claim 4 wherein the roller elements of the first and second stitch roller members are of the same diameter and spaced from each other a distance equal to or less than ¼ the diameter of the roller element along the outer circumferential surface of the tread in the circumferential direction of the tread.

6. A tire fabricating apparatus according to claim 5 wherein the roller elements of the first and second stitch roller members that are located at the same side of the tread centerline are supported by a common support member.

7. A tire fabricating apparatus according to claim 5 wherein the second stitch roller member is located at a more downstream position with respect to a rotating direction of the drum than the first stitch roller member, and wherein the pressing means is constructed such that the pressing force applied by the first stitch roller member is comparatively weaker than the pressing force applied by the second stitch roller member.

8. A tire fabricating apparatus according to claim 6 wherein the pressing means includes a support pressing member for moving each support member and the roller elements supported by the support member integrally toward the outer circumferential surface of the tread in an inward radial direction of the tread, the support member being rotatably coupled with the support pressing member for rotation about an axis parallel with the rotatable shaft of the drum.

9. A tire fabricating apparatus according to claim 8 wherein the pressing member is provided with an angle holding member for restricting rotation of the support member within a predetermined range so that the roller elements opposed to the outer circumferential surface of the tread in a state where these roller elements are not engaged with the outer circumferential surface of the tread.

10. A tire fabricating apparatus according to claim 6 wherein the second stitch roller member is located at a more downstream position with respect to a rotating direction of the drum than the first stitch roller member, and wherein the pressing means is constructed such that the pressing force applied by the first stitch roller member is comparatively weaker than the pressing force applied by the second stitch roller member.

* * * * *